May 11, 1937.　　　　S. SCHIFF　　　　2,080,012
PLASTIC HANDLING MACHINERY
Filed April 1, 1935　　　2 Sheets-Sheet 2

Inventor
Sigmund Schiff
By Murray & Zugelter
Attorneys.

UNITED STATES PATENT OFFICE 2,080,012

PLASTIC HANDLING MACHINERY

Sigmund Schiff, Cincinnati, Ohio, assignor to The J. H. Day Company, Cincinnati, Ohio, a corporation of Ohio Application April 1, 1935, Serial No. 14,097

15 Claims. (Cl. 198—26)

This invention relates to plastic handling machinery, and particularly to machinery for handling dough in bakeries wherein a large output of bakery goods necessitates the employment of a system of automatic machines. In such a system the working, conveying, and transferring of dough lumps to and from the various machines must be very accurately timed to preclude disrupting the systematic process, as any errors, such as the formation of doubles or multiples of lumps, are carried on throughout the system and often result in a multiplication of errors or delays which have a very deleterious effect upon the efficiency of the system and the quality of the finished product.

One object of the present invention is to provide means for improving the timing aspect of the system at a most vital point therein. More specifically, it is an object of the invention to provide an improved and efficient transfer device known as a loading timer, which has application to the system particularly between the baller, or rounder, and the proofer, although it may obviously be employed in other environments.

Another object of the invention is to provide a loading timer which is simple, dependable and accurate in its function, and in which the lumps of plastic will not be delayed during the transfer thereof by reason of adherence of the mass to any parts of the device.

A further object of the invention is to provide a loading and timing mechanism with a synchronized jogging device which is capable of such adjustments as will insure a definite rate of lump feeding, and without the formation of doubles or a congested condition of dough lumps.

The foregoing and other objects are attained by the means described herein and disclosed in the accompanying drawings, in which.

Figure 1:
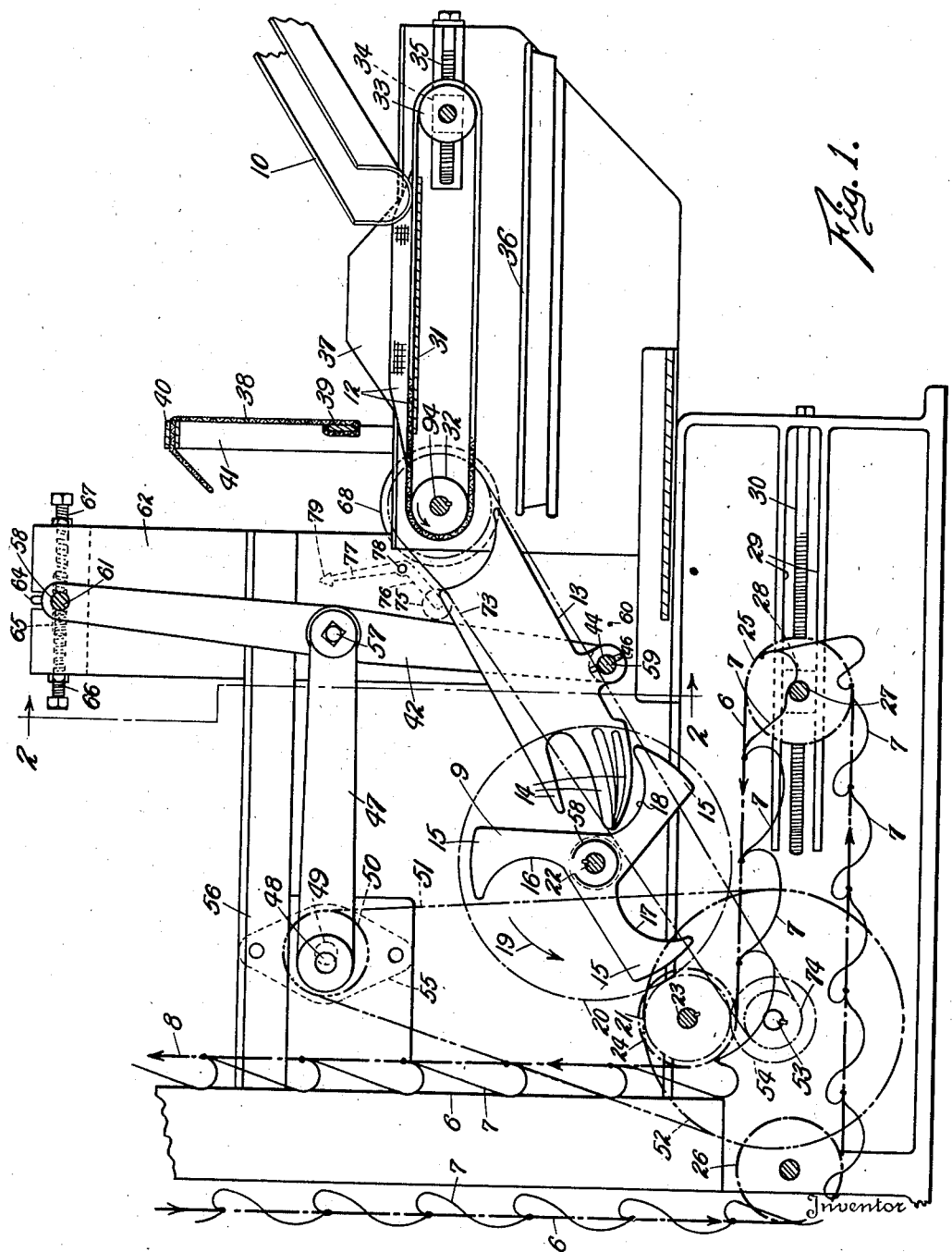
Fig. 1 is a longitudinal cross-sectional view of the device of the invention.

The device of this invention is presented as an improvement over the device disclosed in my prior Patent No. 1,850,637, granted on March 22, 1932. The flexible loop conveyor which is conventionally illustrated herein, may be of the same character as disclosed in said prior patent, if desired, it being understood that the specific details of the flexible loop structure form no material part of the present invention.

Reference is now had to the drawings wherein, as in my said prior patent, a pair of spaced parallel chains, one of which is indicated at 6, carries a series of successive flexible loops 7 or fabric pockets adapted to receive and convey individual dough lumps upwardly in the direction of the arrow 8, to a proofer or other dough treating or handling machine, not shown. The loop charging mechanism, which in part comprises the intake drum 9, is located intermediate the elevator portion just mentioned, and a chute or runway 10 that delivers dough lumps from a rounder, baller or other machine, not shown. The latter element of the system preferably is located close to the present machine so as to enable the use of a very short chute 10, the purpose of this being to eliminate from the system, as much as possible, the uncertainty of gravity feeding. Whatever slight error may enter into the delivery rate in the baller and chute 10, however, is corrected and restored to normal by the loader or loop charging mechanism, as will be explained hereinafter.

Figure 3:
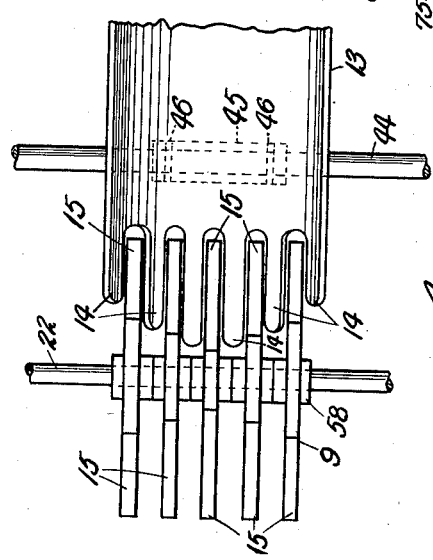
Fig. 3 is a detail view showing in plan a lump presenting basket and an associated intake or timing drum.

Lumps of dough delivered by the chute 10 fall upon a feed conveyor or spacer belt 12 the upper run of which moves in the direction indicated, for depositing the dough lumps in a short inclined basket 13. The basket has at its forward end a series of spaced curved fingers 14, the free ends of which fingers are upturned so as to support a dough lump therein. The timing loader or loop charging mechanism comprises the intake drum 9 which is constituted of a series of spaced plates or pick-up elements 15, so arranged and formed as to enter between the curved spaced fingers of the short inclined basket, in the manner indicated by Fig. 3. The series of plates or elements 15 are made in varying configurations or shapes so as to provide the curved recesses or pockets 16, 17 and 18. As the spaced plates or pick-up elements of the intake drum are rotated in the direction of arrow 19, the series of pockets advance through the fingers of the inclined basket thereby to remove from the basket any dough lump that may be resting therein. Continued rotation of the intake drum results in the successive depositing of dough lumps into successive conveyor loops 7 as said loops travel beneath the intake drum in the direction indicated by arrows associated with the loop chain. As is evident, each complete rotation of the intake drum results in the removal of three successive lumps from the basket, and positive timed deposition of said lumps into three successive loops 7, when the structure is provided with three pick-up elements such as 15. It will be understood, of course, that the number of pick-up elements and pockets such as 16 may be more or less than the three illustrated herein, depending upon the size of the drum and the type of service that the device is to perform.

Rotation of the intake drum may be effected in any suitable manner, such as by means of inter-meshing gears 20 and 21 on the shafts 22 and 23 of the drum and loop conveyor sprockets, respectively. It will be noted that the loop conveyor chains are supported upon pairs of sprockets 24, 25, and 26. The shafts or studs which support these sprockets are suitably mounted upon the frame of the machine, and one of said shafts such as 27, may be rendered adjustable for the purpose of tightening the chains 6. Any suitable means may be employed for adjusting the position of shaft 27, there being shown conventionally a sliding bearing block 28 supported by the ways 29 and movable longitudinally of the ways by means of a long adjusting screw 30.

With reference to the mechanism for feeding dough lumps to the inclined basket 13, it may be noted that the belt 12 travels over a supporting plate 31 as the conveyor rolls 32 and 33 are rotated in the direction indicated. The shaft of roll 33 may be rendered adjustable toward and from the other roll, in a manner quite similar to that employed for tightening the loop conveyor chain. The belt tightener, therefore, may include opposed sliding bearing blocks 34 and adjusting screws 35 associated therewith. Beneath the feed conveyor or spacer belt 12 may be located a suitable catch pan 36 for flour that may fall from the lumps as they are fed along the belt and chute 10.

Figure 2:
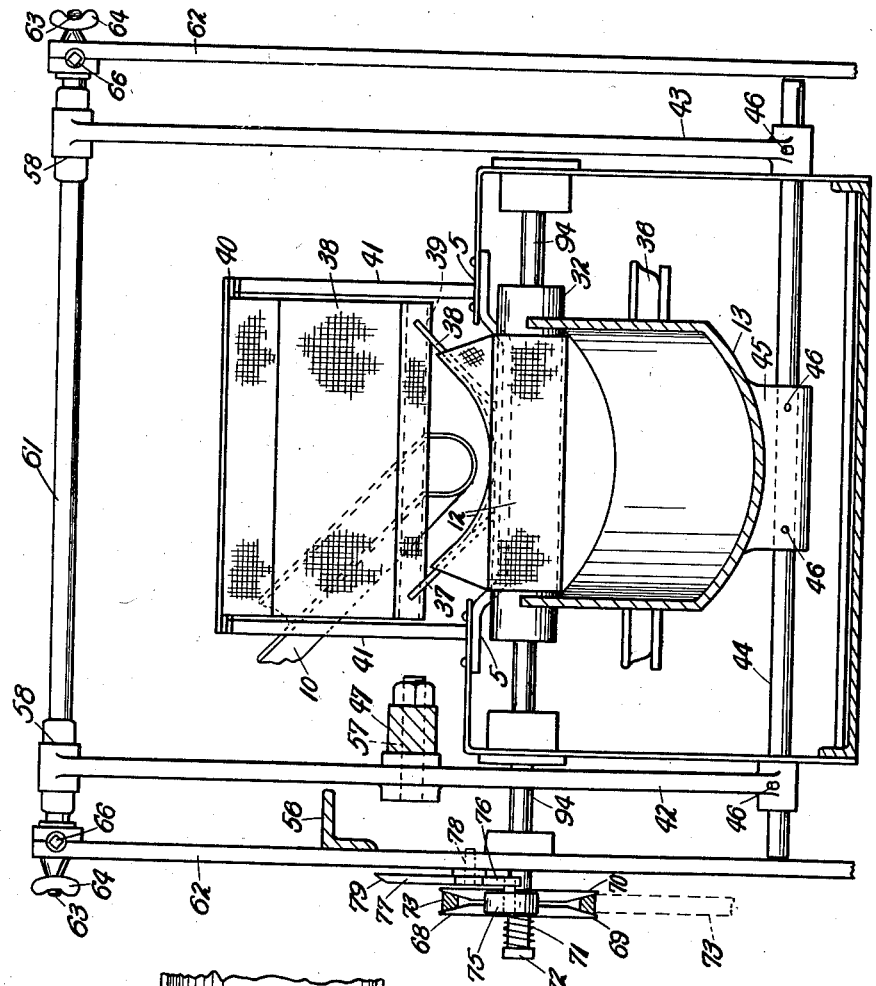
Fig. 2 is a slightly enlarged cross-sectional view taken on line 2—2 of Fig. 1.

Adjacent to the discharging region of the chute 10, there may be provided a trough having upwardly turned side walls 37 and 38 which function as a lump guide means, to automatically arrange the lumps in line formation upon the belt. The trough also precludes rolling of the dough lumps over the sides of the belt. The trough may be supported in any suitable manner, upon a stationary frame part such as is indicated at 5. It will be observed that the belt is arranged to ride upon the upper face of the trough, so as to be flexed to the shape of the trough, as indicated in Fig. 2. By means of this construction, the dough lumps are placed under the influence of the moving belt as soon as they leave the chute 10. In order that the momentum of the lumps, as they leave the chute, may not carry them forwardly too far along the belt and thereby effect a direct deposition thereof into the basket 13, there is provided a suspended sheet of fabric or other flexible material 38 having a weight 39 associated therewith and disposed at such an elevation above the belt as to provide an obstruction to any rolling movement of lumps forwardly along the belt. The sheet 38 preferably is adjustable at the top portion 40 of the standards 41, to adapt the mechanism for the handling of various sized lumps.

Attention is now directed to the short inclined basket 13 and the supporting mechanism therefor. The characters 42 and 43 indicate a pair of oscillatory links or suspension bars which, with the transverse shaft or bar 44, form a cradle for supporting the basket. It will be observed that the free ends of bar or rod 44 extend to a position in close proximity with the frame uprights 62, and may ride lightly upon them to preclude any such lateral movement of the cradle as would misalign the basket fingers from the spaces between the pick-up plates of the intake drum. The boss or bracket 45 of the basket, and the members 42, 43, and 44 are connected together so as to provide a rigid structure. These parts, therefore, may be pinned or otherwise fixedly related as indicated at 46, so that all said elements may be oscillated as a unitary structure by means of a pitman or connecting rod 47 which may be reciprocated in any suitable manner, such as by means of a crank or eccentric pin or stud 48. The rotating shaft 49 of the eccentric may have fixed thereon a sprocket 50 driven by means of a chain 51 that passes over the large sprocket 52, which latter is fixed upon a shaft 53 driven by means of the inter-meshing gears 21 and 54. The bearing bracket 55 of the eccentric mechanism may be fixed upon any suitable bracket or stationary support 56 of the frame. The end of the pitman or connecting rod which is opposite to the eccentric stud 48 is pivoted as at 57 upon the suspended bar 42 so that operation of the eccentric will serve to oscillate the cradle about its pivots or suspension points 58.

From the foregoing it will be understood that operation of the pitman by means of the eccentric, during rotation of the intake drum 9, will result in oscillation or jogging of the cradle and basket 13 toward and from the hub 58 of the drum. The points 59 and 60 indicate an approximation of the extent of oscillation or jogging movement. The desired result as to adjustment of the basket toward and from the intake drum may be accomplished by other methods, such as by lengthening or shortening the pitman 47, but the means illustrated and described herein are considered preferable.

The eccentric preferably is driven at such a speed of rotation as will jog the basket a given number of strokes upon each presentation thereto of a drum pocket such as 16, 17 or 18. A satisfactory arrangement results from jogging the basket three strokes between successive pockets of the intake drum.

In order to preclude the formation of doubles or a failure of the intake drum to receive a dough lump squarely from the basket 13, especially when the machine is used for handling different sizes of dough lumps, there is provided a means for adjusting the extent to which the fingers 14 of the basket may enter between the plates or pick-up elements of the intake drum. One of such means is disclosed in Figs. 1 and 2, and it comprises a pair of sliding supports for the ends of the shaft 61 where they are supported upon the standards 62 of the machine frame. The ends of said shaft are provided with threads 63 and cooperative wing nuts or the like 64 which clamp against the standards 62 for holding the shaft in adjusted positions within slots 65 formed in the standards. Each standard has mounted thereon a pair of screws 66 and 67 which may be rotated to abut opposite sides of the shaft ends for the purpose of fixing the position of the 65 shaft. These opposed screws constitute a means in addition to the nuts or fasteners 64 for locking the shaft ends in adjusted positions at which the forward or fingered end of the basket may enter to a greater or lesser extent between the plates or pick-up elements of the intake drum. With reference to Fig. 1, it will be understood that disposition of the shaft 61 to the left of slot 65 will withdraw the fingers of the basket partially from the spaces between the pick-up elements 15, so that only a small portion of the basket fingers will enter between the drum plates. When the device is adjusted in the manner just mentioned, the device will more properly and accurately handle dough lumps of small size, without the presentation of more than one lump to each intake drum pocket. By adjusting the shaft 61 for disposition of its ends to the right of slot 65, the opposite effect will be produced that is, a greater portion of the basket fingers will enter between the plates of the intake drum, so that large lumps held by the basket fingers will be squarely and individually received by the pockets of the intake drum, without the likelihood of having the plates 15 to lift or partially lift any other lumps in the basket, and thereby pile up such lumps to form doubles.

It is of course evident that, regardless of the position to which the shaft 61 is adjusted, the basket will be jogged or oscillated uniformly, so that any dough lumps which may pile up within the basket will not adhere to one another or to the material of the basket, because the jogging movement serves to quickly and definitely dislodge the lumps and deposit them successively in the proper position for reception by the pick-up elements of the intake drum.

For the proper presentation of different sized dough lumps to the intake drum, it is desirable to not only adjust the basket relative to the drum, but to also provide for a varying rate of lump delivery to the basket. It is therefore specified that the rate of movement of the belt 12 should be variable. This variation in belt speed may be accomplished in different ways wherefore there is disclosed but one satisfactory means to affect the variation. Such means may comprise the application of a split pulley 68, the halves 69, and 70 of which may be yieldably urged together by means of a spring 71 whose tension may be adjusted by means of a suitable adjuster, which may be in the form of a collar 72. A V belt 73, when under a given tension will but slightly separate the halves of the pulley as the belt is driven by means of another pulley 74 fixed upon one of the rotating shafts, such as 53. By increasing the tension upon, or applying an extraneous force to the belt, the spring 71 will yield so as to permit further separation of the pulley halves thereby to reduce the effective perimeter of the pulley 68, with the result that the shaft 94 thereof is driven at a greater speed of rotation. Any known means may be employed for thus adjusting the belt 73, there being shown a rotatable roller 75 mounted upon one arm of a bell crank 76, the other arm 77 being exposed for manipulation of the bell crank about its pivot 78, for increasing or reducing the pressure of the roller 75 upon the belt. If desired, the free end 79 of the bell crank arm 77 may be made in the shape of a pointer or indicator adapted to cooperate with markings on the frame, to indicate the differences in belt speeds obtainable by reason of disposition of the pointer to various markings on the frame. It is to be understood that the belt adjuster may be held frictionally or otherwise to any of its adjusted positions.

It is of course immaterial whether the adjustable pulley 68 is mounted upon the shaft 94 of the roll 32, or upon the shaft which drives the belt 73, for example shaft 53, as the result would be the same. Also, the adjustable type pulley may be replaced by a suitable change gear unit or other known variable speed mechanism, as is obvious.

The effectiveness of the machine for handling different sized lumps of dough, is enhanced by the cooperative relationships obtainable by adjusting both the delivery speed of the feed conveyor and the extent to which the fingers of the basket enter between the plates of the intake drum. The jogging or oscillating motion of the basket also cooperates in securing a regular and dependable coaction between the feed conveyor and the intake drum, for without the jogging movement the intervention of sluggish gravitation resulting from adhesion of the lumps to the basket, would render inaccurate the adjustments of conveyor feed speed and extension of the basket fingers into the intake drum. The rate at which the dough lumps are fed to the pick-up drum is such that gravity alone may not be depended upon to move the lumps into proper position for reception by the drum pockets. The addition of the jogging motion, however, increases the speed of lump feed and precludes such settling of the lumps in the basket as would result in adhesion of the lumps thereto.

What is claimed is:

1. Plastic handling machinery comprising in combination, a succession of moving pockets for receiving and conveying lumps of plastic, a lump spacing and feeding means, means for picking up and depositing into successive ones of the moving pockets the lumps fed by the spacing and feeding means, means for effecting synchronized movement of the pick-up and depositing means and the moving pockets, and a jogging means associated with the pick-up and depositing means, and disposed between the lump feeding means and the succession of moving pockets, and means for actuating the jogging means at a rate not exceeding five strokes for each pick-up and depositing movement imposed upon the fed lumps of plastic.

2. Plastic handling machinery comprising in combination, a succession of receivers for conveying lumps of plastic, a feeding means for the lumps, and an intermediate pick-up and deposit unit for timing the deposition of fed lumps into successive ones of the receivers, said intermediate unit comprising an oscillating cradle and a basket oscillatable therewith in position to receive the lumps advanced by the feeding means, and means for oscillating the cradle lengthwise of the basket.

3. Plastic handling machinery comprising in combination, a succession of flexible receivers for conveying lumps of plastic, a feeding means for the lumps, and an intermediate pick-up and deposit unit for timing the deposition of fed lumps into successive ones of the flexible receivers, said intermediate unit comprising an oscillating cradle and a basket oscillatable therewith in position to receive the lumps advanced by the feeding means, and means for regulating the feeding speed of the lump feeding means without changing the operating rate of the pick-up and deposit unit.

4. Plastic handling machinery comprising in combination, a succession of receivers for conveying lumps of plastic, a feeding means for the lumps, and an intermediate pick-up and deposit unit for timing the deposition of fed lumps into successive ones of the receivers, said intermediate unit comprising an oscillating cradle and a basket oscillatable therewith in position to receive the lumps advanced by the feeding means, means for regulating the feeding speed of the lump feeding means without changing the operating rate of the pick-up and deposit unit, and means for shifting the basket independently of the scope of its oscillatory movement.

5. Plastic handling machinery comprising in combination, a succession of moving receivers for conveying lumps of plastic, a feeding means for the lumps, and an intermediate structure comprising a timing and loading element for depositing lumps into successive ones of the moving receivers, an adjustable cradle, an inclined basket supported by the cradle in position for directing lumps from the feeding means to the timing and loading element, and means for reciprocating the basket in the direction of its length so as to successively strike and impel the lumps toward the timing and loading element.

6. Plastic handling machinery comprising in combination, a succession of moving receivers for conveying lumps of plastic, a feeding means for the lumps, and an intermediate structure comprising a timing and loading element for depositing lumps into successive ones of the moving receivers, a cradle, and an inclined basket supported by the cradle in position for directing lumps from the feeding means to the timing and loading element, and means for oscillating the cradle and its associated basket in the direction of extension thereof toward and from the timing and loading element.

8. Plastic handling machinery comprising in combination, a succession of moving receivers for conveying lumps of plastic, a feeding means for the lumps, and an intermediate structure comprising a timing and loading element for depositing lumps into successive ones of the moving receivers, a cradle, and an inclined basket supported by the cradle in position for directing lumps from the feeding means to the timing and loading element, means for oscillating the cradle and its associated basket toward and from the timing and loading element, and means for adjusting the rate of feed of the feeding means when adjusting the cradle position, to adapt the machine for handling lumps of various sizes.

8. Plastic handling machinery comprising in combination, a receiving means for lumps of plastic substance, a feeding means for the lumps, and an intermediate timing and loading drum comprising a series of spaced pick-up elements providing pockets for picking up lumps of plastic substance in succession and depositing them regularly into the said receiving means, a mechanism for rotating the drum, a short inclined basket and a cradle for supporting said basket in position to receive lumps from the feeding means, a series of spaced fingers on an end of the basket to enter between the spaced pick-up elements of the rotating drum, to present lumps of plastic to the pockets of the drum, means for reciprocating the cradle in the direction of extension of the basket, and means for adjusting the cradle to vary the extent to which the fingers of the basket may enter the spaces between the pick-up elements.

9. Plastic handling machinery comprising in combination, a receiving means for lumps of plastic substance, a feeding means for the lumps, and an intermediate timing and loading drum comprising a series of spaced pick-up elements providing pockets for picking up lumps of plastic substance in succession and depositing them regularly into the said receiving means, a mechanism for rotating the drum, a short inclined basket and a cradle for supporting said basket in position to receive lumps from the feeding means, a series of spaced fingers on an end of the basket to enter between the spaced pick-up elements of the rotating drum, to present lumps of plastic to the pockets of the drum, means for adjusting the cradle to vary the extent to which the fingers of the basket may enter the spaces between the pick-up elements, and means for jogging the basket at all positions of the cradle adjustment.

10. Plastic handling machinery comprising in combination, a receiving means for lumps of plastic substance, a feeding means for the lumps, and an intermediate timing and loading drum comprising a series of spaced pick-up elements providing pockets for picking up lumps of plastic substance in succession and depositing them regularly into the said receiving means, a mechanism for rotating the drum, a short inclined basket and a cradle for supporting said basket in position to receive lumps from the feeding means, a series of spaced fingers on an end of the basket to enter between the spaced pick-up elements of the rotating drum, to present lumps of plastic to the pockets of the drum, means for adjusting the cradle to vary the extent to which the fingers of the basket may enter the spaces between the pick-up elements, means for jogging the basket at all positions of the cradle adjustment, and means for altering the lump feeding rate at the feeding means.

11. Plastic handling machinery comprising in combination, a receiving means for lumps of plastic substance, a feeding means for the lumps, and an intermediate timing and loading drum comprising a series of spaced pick-up elements providing pockets for picking up lumps of plastic substance in succession and depositing them regularly into the said receiving means, a mechanism for rotating the drum, a short inclined basket and a cradle having a pivoted upper end, and a lower end supporting said basket in position to receive lumps from the feeding means, a series of spaced fingers on an end of the basket to support a lump and to enter between the spaced pick-up elements of the rotating drum, thereby to present successive lumps to the pockets of the drum, and means for insuring presentation of but a single lump at a time to the drum pockets, whether the lumps be large or small, comprising an adjusting mechanism for the pivoted upper end of the cradle to dispose the fingers of the basket at different degrees of extension into the spaces between the pick-up elements of the drum.

12. Plastic handling machinery comprising in combination, a receiving means for lumps of plastic substance, a feeding means for the lumps, and an intermediate timing and loading drum comprising a series of spaced pick-up elements providing pockets for picking up lumps of plastic substance in succession and depositing them regularly into the said receiving means, a mechanism for rotating the drum, a short inclined basket and a cradle for supporting said basket in position to receive lumps from the feeding means, a series of spaced fingers on an end of the basket to support a lump and to enter between the spaced pick-up elements of the rotating drum, thereby to present successive lumps to the pockets of the drum, means for insuring presentation of but a single lump at a time to the drum pockets, whether the lumps be large or small, comprising an adjusting mechanism for the cradle to dispose the fingers of the basket at different degrees of extension into the spaces between the pick-up elements of the drum, and means for jogging the basket at all positions of the cradle adjustment.

13. Plastic handling machinery comprising in combination, a receiving means for lumps of plastic substance, a feeding means for the lumps, and an intermediate timing and loading drum comprising a series of spaced pick-up elements providing pockets for picking up lumps of plastic substance in succession and depositing them regularly into the said receiving means, a mechanism for rotating the drum, a short inclined basket supported in position to receive lumps from the feeding means, a series of spaced fingers on an end of the basket to support a lump and to enter between the spaced pick-up elements of the rotating drum, thereby to present successive lumps to the pockets of the drum, and means for jogging the basket at a rate not exceeding five strokes as each drum pocket approaches the basket fingers and moves into position for removing a lump therefrom.

14. Plastic dough handling machinery comprising in combination, a means for receiving and conveying lumps of plastic dough, a lump spacing and feeding means, means for picking up and depositing onto the receiving and conveying means the lumps fed by the spacing and feeding means, means for effecting synchronized movement of the pick up and depositing means and the receiving and conveying means, a jogging means associated with the pick up and depositing means, and disposed between the lump feeding means and the receiving and conveying means, means for actuating the jogging means at a rate not exceeding five strokes for each pick up and depositing movement imposed upon the fed lumps of plastic dough, and means for regulating the feeding speed of the lump feeding means without changing the operating rate of the pick up and deposit means.

15. Plastic dough lump handling machinery comprising in combination, a means for receiving and conveying lumps of plastic dough, a lump spacing and feeding means, means for picking up and depositing onto the receiving and conveying means the lumps fed by the spacing and feeding means, means for effecting synchronized movement of the pick up and depositing means and the receiving and conveying means, a jogging means associated with the pick up and depositing means, and disposed between the lump feeding means and the receiving and conveying means, means for actuating the jogging means so as to aid movement of the lumps passing through the pick up and depositing means, and means for regulating the feeding speed of the lump feeding means without changing the operating rate of the pick up and deposit means.

SIGMUND SCHIFF.